United States Patent [19]
Van Brunt et al.

[11] Patent Number: 5,778,204
[45] Date of Patent: Jul. 7, 1998

[54] HIGH-SPEED DOMINANT MODE BUS FOR DIFFERENTIAL SIGNALS

[75] Inventors: Roger W. Van Brunt, San Francisco; Florin Oprescu, Sunnyvale, both of Calif.

[73] Assignee: Apple Computer, Inc., Cupertino, Calif.

[21] Appl. No.: 880,252

[22] Filed: Jun. 23, 1997

Related U.S. Application Data

[63] Continuation of Ser. No. 476,460, Jun. 7, 1995, abandoned, which is a continuation of Ser. No. 80,574, Jun. 21, 1993, Pat. No. 5,493,657.

[51] Int. Cl.[6] ........................................ H04Q 9/14
[52] U.S. Cl. ........................... 395/308; 340/825.07
[58] Field of Search ................................ 395/281, 306, 395/308, 309, 730; 370/402; 340/825.07, 825.08

[56] References Cited

U.S. PATENT DOCUMENTS

| | | | |
|---|---|---|---|
| 4,593,282 | 6/1986 | Acampora et al. | 340/825.5 |
| 4,897,784 | 1/1990 | Nay | 395/285 |
| 4,985,892 | 1/1991 | Camarata | 370/123 |
| 5,025,500 | 6/1991 | Phinney | 370/85.13 |
| 5,107,257 | 4/1992 | Fukuda | 340/825.08 |
| 5,119,398 | 6/1992 | Webber, Jr. | 375/219 |
| 5,163,048 | 11/1992 | Heutink | 370/85.6 |
| 5,200,743 | 4/1993 | St. Martin | 340/825.07 |
| 5,249,183 | 9/1993 | Wong et al. | 370/85.3 |
| 5,311,114 | 5/1994 | Sambamurthy et al. | 370/31 |
| 5,339,307 | 8/1994 | Curtis | 370/13.1 |
| 5,414,708 | 5/1995 | Webber et al. | 370/85.3 |

*Primary Examiner*—Jack P. Harvey
*Assistant Examiner*—Paul R. Myers
*Attorney, Agent, or Firm*—Blakely, Sokoloff, Taylor & Zafman

[57] ABSTRACT

A bus circuit for implementing a high speed dominant logic bus for a differential signal. The bus circuit is useful in a communication network having a plurality of multi-port nodes that are coupled by point-to-point links that communicate differential signals. Each port in the node includes a bus driver that receives the differential signal received at the port. The bus driver supplies a differential current signal to a first bus. A terminator circuit is coupled to the first differential bus, to receive the differential current signals supplied from the ports. The terminator circuit, responsive to the differential current signal, outputs a differential voltage signal indicative of either a dominant state or a non-dominant state to a second differential bus, which is coupled to the plurality of ports for transmission. A biasing circuit for the bus drivers allows operation at low voltages, and furthermore insures the zero crossing of the differential voltage signal on the second differential bus.

4 Claims, 5 Drawing Sheets

HIGH-SPEED DOMINANT MODE BUS FOR DIFFERENTIAL SIGNALS

CROSS-REFERENCE TO RELATED APPLICATION

This is a continuation of application Ser. No. 08/476,460, filed Jun. 7, 1995, now abandoned, which is a continuation of application Ser. No. 08/080,574, filed Jun. 21, 1993, issued as U.S. Pat. No. 5,493,657.

The present application is related to the following commonly assigned patent application: Ser. No. 08/027,015, filed Mar. 5, 1993, now U.S. Pat. No. 5,493,657, entitled "A Bus Interconnect Circuit Including Port Control Logic for a Multiple Node Communication Network".

BACKGROUND OF THE INVENTION

1. Field of the Invention

The present invention relates to high speed dominant logic buses in communication systems that receive and transmit differential signals.

2. Description of Related Art

Buses are widely used to electrically connect two or more electronic devices. For example, a bus may be utilized to connect a printer, a monitor, and a keyboard with a CPU (Computer Processing Unit). Furthermore, buses are utilized within processors to connect various components of that processor, for example to connect memory with a particular processing unit.

In order to communicate between components, electrical signals are applied to the bus by a transmitting station and received by other stations on the bus. For high speed serial communication, a "differential" type of signal transmission has been found to be particularly advantageous. A differential signal is transmitted over a pair of wires. Each wire transmits the same signal, but with different polarities. A differential signal provides a higher signal to noise ratio, and better overall performance in part because timing distortions are minimized. The proposed IEEE 1394 Standard specifies a standard for a new high speed serial bus that transmits and receives differential signals over point-to-point links.

In addition to the type of signal transmitted on a bus, another design issue is the type of logic used by the bus: a "nondominant" logic or a "dominant" logic. In a dominant logic bus, one of the logic states is "dominant", which means that if any device places the dominant value on the bus, then the bus will assume that value. A dominant logic bus is particularly useful during arbitration in which more than one node can drive the bus at any time. For example, in a two-state dominant bus in which "high" is the dominant state, if at least one node drives the bus to a "high" state then all the nodes detect a "high" state on the bus. All the nodes detect a "low" state on the bus if and only if all the nodes drive the bus to the "low" state.

It would be advantageous to provide a bus circuit for high speed transmission of differential signals, and with dominant logic. Such a bus could be useful for high speed communications, including use as a bus complying with the IEEE 1394 Standard.

SUMMARY OF THE INVENTION

The present invention provides a high speed bus circuit for a communication system that communicates with differential signals and has a dominant logic.

The present invention provides the above advantages with a high speed, dominant logic, differential signal bus circuit having a split configuration including a first differential bus and a second differential bus, and a terminator circuit that couples the first and second differential buses. One or more bus driver circuits are coupled to the first differential bus, and one or more receivers are coupled to the second differential bus. The "split" bus configuration has advantages including greater bandwidth than a single bus; i.e., the split bus provides faster data communication in part because the loading impedance of the drivers and receivers is split between the first and second buses. Furthermore, the impedance of the first (receiving) bus is reduced by the terminator, as a result of coupling the first bus to the source of the terminator's input transistors.

The high speed dominant logic differential signal bus circuit is useful in a communication network having a plurality of multiport nodes that are interconnected with one or more point-to-point links. The IEEE 1394 Standard defines one such communication network, which specifies that each node has its own separate bus.

A single port includes a bus driver circuit and bus receiver circuit. A multiport node includes a plurality of ports interconnected by the split bus configuration. Each port includes a bus driver coupled to receive a differential voltage input signal. In response thereto the bus driver outputs a differential current signal to the first differential bus. The terminator circuit, coupled to the first differential bus, receives the differential current signal from each port. In response thereto the terminator circuit outputs a bus differential voltage signal which is supplied to the second differential bus. The second differential bus is coupled to the receivers in the multiple ports. Thereby, the differential voltage signal is supplied from the second differential bus to the receivers, and then to ports in other nodes via point-to-point links. Additionally, the second differential bus may be connected directly to an internal port that is connected to a local host.

A current source biasing circuit provides a voltage $V_P$ that controls current sources within the drivers, so that at a zero crossing point of the differential voltage input signal, the differential current signals from the driver are approximately one-half of their full amount. Thus, by symmetry and matching, this assures that the zero crossing point of the differential input signal is equivalent to the zero crossing point of the bus differential voltage signal which is supplied from the terminator circuit to the second differential bus. This feature improves performance by reducing timing distortions. Furthermore, the current source biasing circuit substantially reduces the substantial voltage offset that would otherwise occur when multiple drivers are driving the receiving bus. As an additional advantage, the current source biasing circuit eliminates the requirement that the current sources in the driver circuit and terminator circuit be cascoded. Also, the current source biasing circuit allows circuit operation at a low voltage, such as 5.0 volts, or even 3.0 volts.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purpose, and therefore resort to the claims is necessary to determine the inventive subject matter.

DETAILED DESCRIPTION OF THE PREFERRED EMBODIMENT

FIGS. 1 through 5 of the drawings disclose various embodiments and aspects of the present invention for purposes of illustration only. One skilled in the art will readily recognize from the following discussion that alternative embodiments of the structures and methods illustrated herein may be employed without departing from the principles of the invention.

Figure 1:
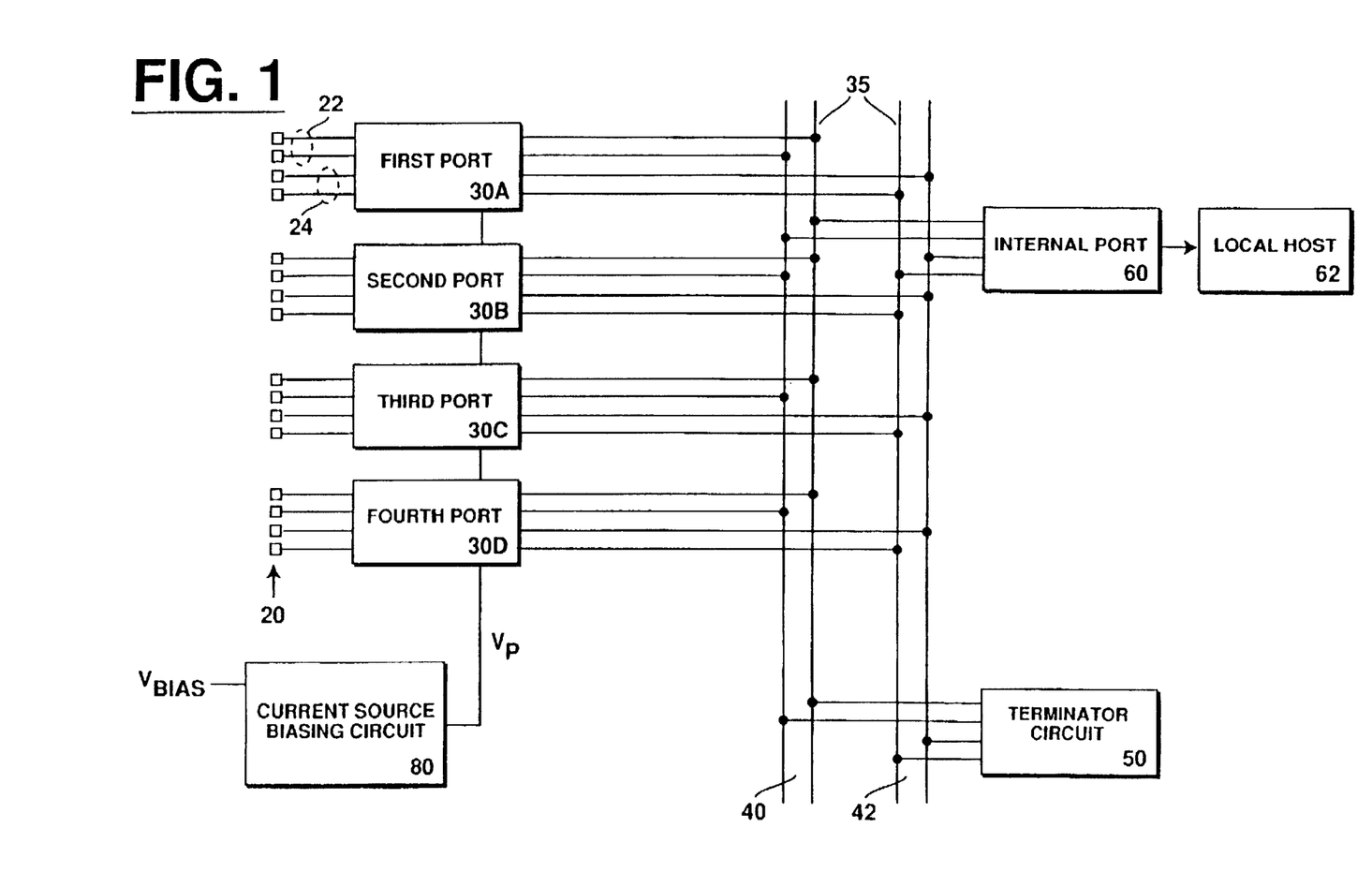
FIG. 1 is a block diagram of a node including a split bus configuration, a terminator circuit coupling the split buses, and a plurality of ports for receiving and transmitting differential signals over point-to-point links.

Reference is made to FIG. 1 which is a diagram of a node incorporating a split bus configuration 35, a plurality of ports 30, and a terminator circuit 50. A plurality of external pins illustrated generally at 20 are provided to receive and transmit differential signals through point-to-point links (not shown) to other nodes that can receive and transmit differential signals.

The pins 20 are arranged in pairs, two pairs to a port, including, a first pair 22 and a second pair 24. A plurality of ports, including a first port 30A, a second port 30B, a third port 30C, and a fourth port 30D are provided to communicate over the external point-to-point links via the plurality of pins 20. The point-to-point links preferably comprise electrical cables. However, other point-to-point links, such as optical links, coaxial cables, or microstrips could also be used in other embodiments.

The ports 30A, 30B, 30C, and 30D are coupled to a split bus configuration 35 that includes a receiving bus 40 and a transmitting bus 42. The construction of the receiving bus 40 and the transmitting bus 42 is conventional, and may be implemented using conventional techniques such as metal in silicon. A terminator circuit 50 couples the receiving bus 40 with the transmitting bus 42. The terminator circuit 50 will be described in further detail elsewhere, particularly with reference to FIG. 4.

An internal port 60 is also coupled to the split bus 35 to provide communication between the split bus 35 and a local host 62. The local host 62 may include conventional control logic and software for arbitrating access to the bus. In the arbitration process, the interconnected nodes arbitrate to determine who will next use the bus. Using any of a number of conventional dominant node arbitration methods, a "winning node" will be determined. The winning node will transmit all its arbitration signals on the bus, and will see (i.e., receive) all those signals on the bus. As a result, it is a property of the dominant logic arbitration process that the last dominant state signal transmitted must have been generated at the winning node. Therefore, at the end of the arbitration process, the ports are configured for unidirectional data flow from that winning node to all other nodes, and that configuration does not change throughout data transfer as long as only the winning node places signals on the bus. High speed data transfer is facilitated thereby.

A biasing circuit 80 is coupled to each of the ports 30A, 30B, 30C, and 30D in order to bias the ports for proper matching with the terminator circuit 50. The biasing circuit 80 will be described in further detail elsewhere, particularly with reference to FIG. 3.

Preferably, the node described in FIG. 1 is implemented in a single digital chip formed of semiconductor material using conventional fabrication techniques for CMOS circuits. Digital processing techniques can be utilized. Furthermore, it is preferred that the resistors described herein are formed in polysilicon. Alternately, the resistor could be formed by transistors biased in the linear region.

Figure 2:
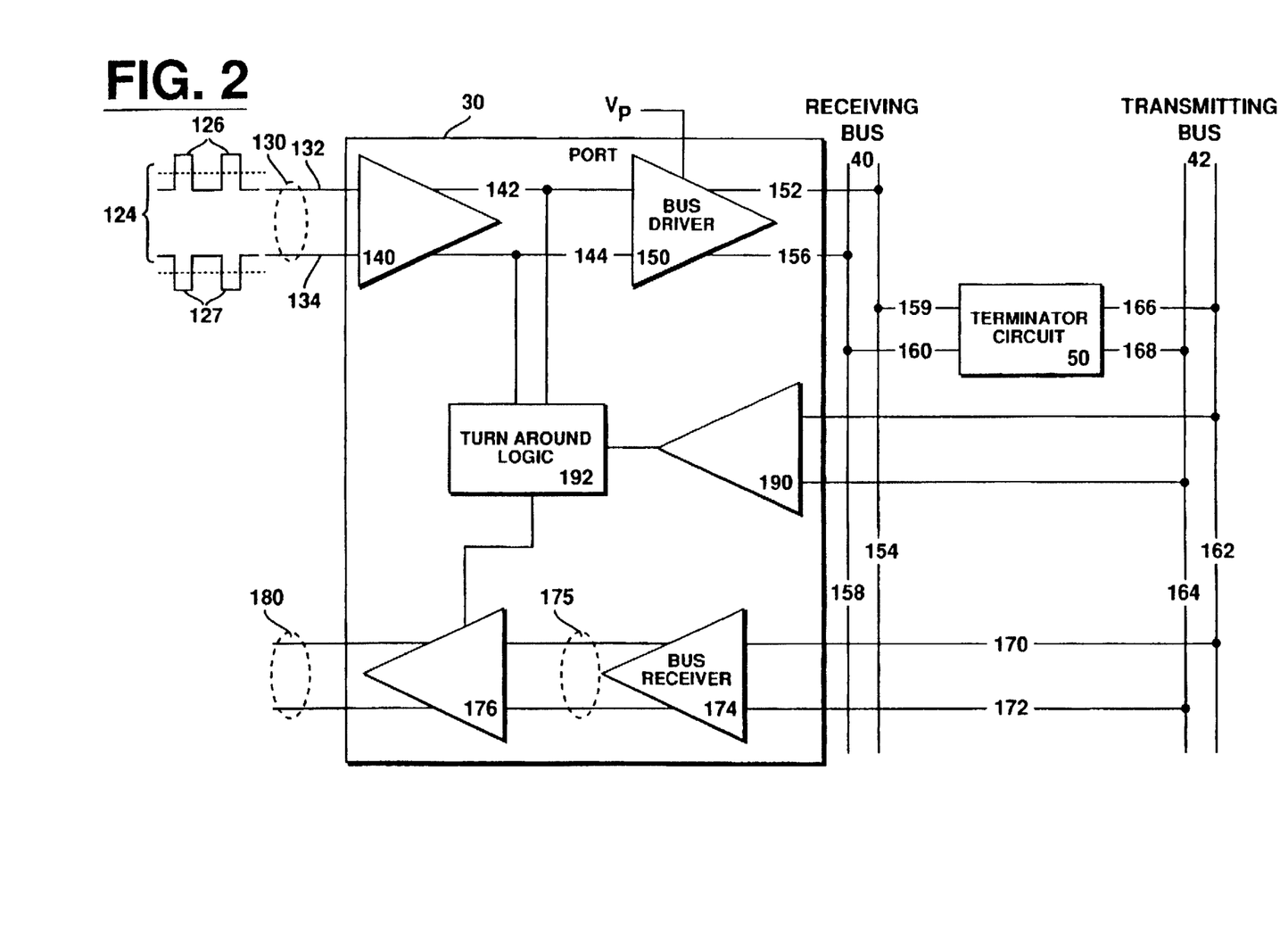
FIG. 2 is a diagram of a single port coupled to a split bus configuration including a receiving bus and a transmitting bus coupled by the terminator circuit.

Reference is made to FIG. 2 which is a circuit diagram of an illustrative port 30 coupled to the split bus 35 that includes the receiving bus 40 and the transmitting bus 42. Preferably each of the ports 30A, 30B, 30C, and 30D shown in FIG. 1 include the circuits to be described with reference to the port 30, shown in FIG. 2.

In FIG. 2, the port 30 receives a differential signal 124 which is a differential voltage signal including a first voltage signal 126 and a complementary voltage signal 127. Collectively, the differential signal 124 is supplied on a differential twisted wire pair 130 that includes a first signal line 132 and a second signal line 134. The differential signal 124 may be provided from another port (not shown), any other electrical device, or any other conventional means. The differential signal 124 is supplied to a conventional signal receiver 140, which may, for example, amplify or buffer the differential signal 124. The output differential signal is supplied on a first line 142 and a second line 144 from the signal receiver 140 to a silicon bus driver 150 whose circuit is described in more detail elsewhere, particularly with reference to the circuit diagram of FIG. 3. The silicon bus driver 150 is a current driver for the differential receiving bus 40. From the silicon bus driver 150, a first driver line 152 drives a first receiving bus line 154 in the receiving bus 40, and a second driver line 156 drives a second receiving bus line 158 in the receiving bus 40. With reference to FIG. 1, it should be apparent that the receiving bus 40 may be coupled to a plurality of additional ports which have similar drivers provided therein.

Figure 4:
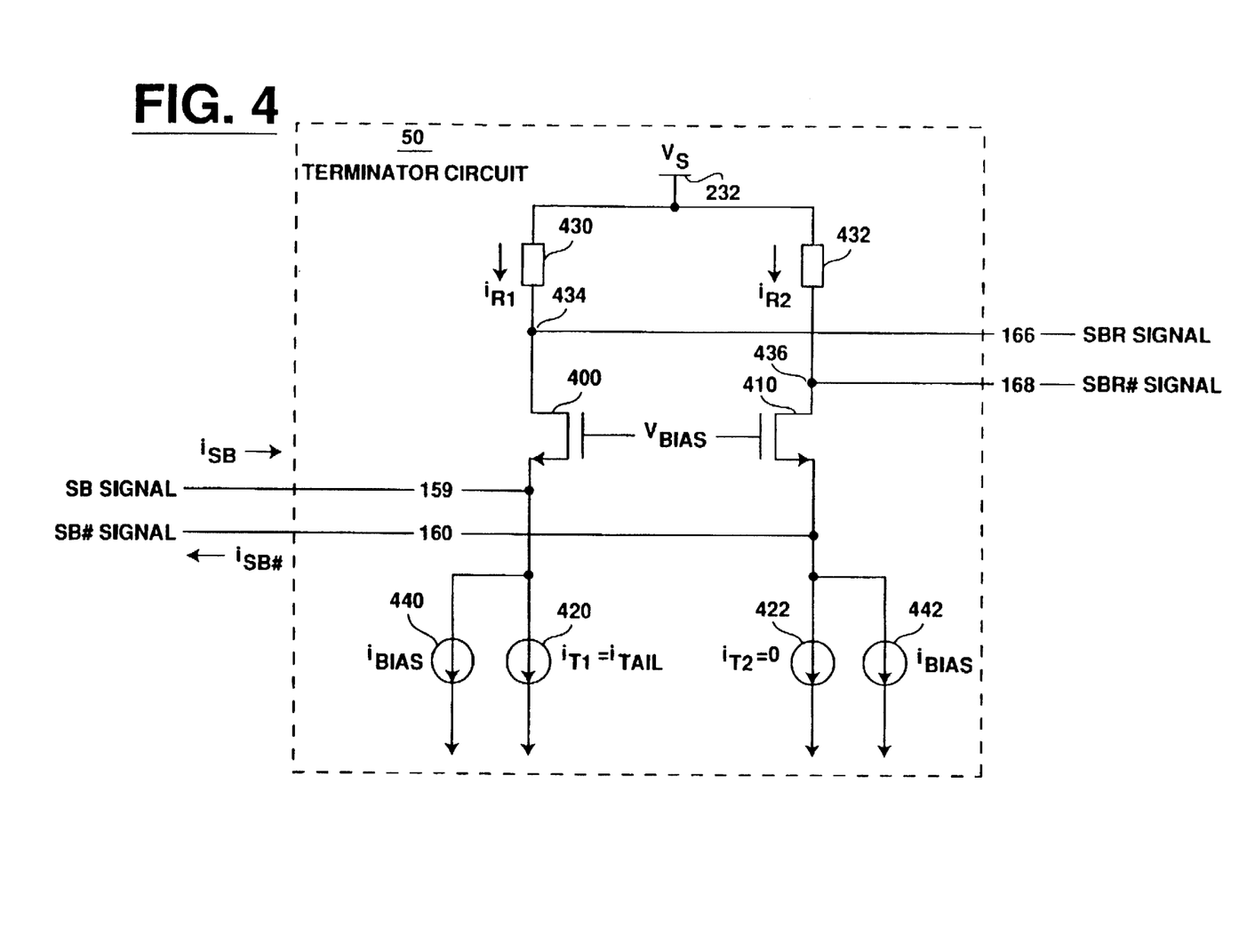
FIG. 4 is a circuit diagram of the terminator circuit.

The terminator circuit 50, to be described in detail with reference to FIG. 4, is coupled to the first receiving bus line 154 via a first line 159 and to the second receiving bus line 158 via a second line 160. Responsive to a differential current signal received on the lines 159 and 160, a differential voltage output is supplied to the transmitting bus 42. The transmitting bus 42 includes a first transmitting line 162 and a second transmitting line 164. The differential voltage output from the terminator circuit 50 is supplied on a first output line 166 to the first transmitting line 162, and on a second output line 168 to the second transmitting bus line 164.

The two lines 162 and 164 of the transmitting bus 42 are coupled to the port 30. With reference to FIG. 1, it should be apparent that the transmitting bus 42 may be coupled to a plurality of additional ports, which also receive a differential voltage signal therefrom. Returning to FIG. 2, to connect to the port 30, the first transmitting bus line 162 is coupled to a first receiver line 170, and the second transmitting bus line 164 is coupled to a second receiver line 172 which are coupled to a conventional silicon bus receiver 174. Thus, the differential voltage signal is supplied to the silicon bus receiver 174, which is described in detail elsewhere, particularly with reference to the circuit diagram of FIG. 5. The output signal from the silicon bus receiver 174 is provided on a line pair 175 to a signal transmitter 176 which transmits the differential signal on a pair of differential output lines 180 from the port 30.

The differential output from the transmitting bus 42 is also applied to a turn around logic receiver 190 which supplies a digital value to turn around logic 192. The turn around logic 192 also receives the signal from the lines 142 and 144 that carry the differential input signal to the bus driver 150. The turn around logic 192 is coupled to the signal transmitter 176 to control whether it is transmitting or not transmitting. The turn around logic 192 controls the direction of the data flow so that bidirectional data flow is provided during arbitration and unidirectional data flow is provided during data transfer. The turn around logic 192 operates as follows: If a high differential voltage signal is detected from the signal receiver 140 on the lines 142 and 144, then the turn around logic 192 disables the signal transmitter 176 so that a nondominant state is asserted. If, however the signal receiver 140 is supplying a low value, and the transmitting bus 42 is in the dominant state, then the signal transmitter 176 is enabled. The turn around logic 192 in the preferred embodiment is described in a commonly assigned, copending patent application entitled "A Bus Interconnect Circuit Including Port Control Logic for a Multiple Node Communication Network", Ser. No. 08/027,015, filed Mar. 5, 1993, which is incorporated by reference herein.

Figure 3:
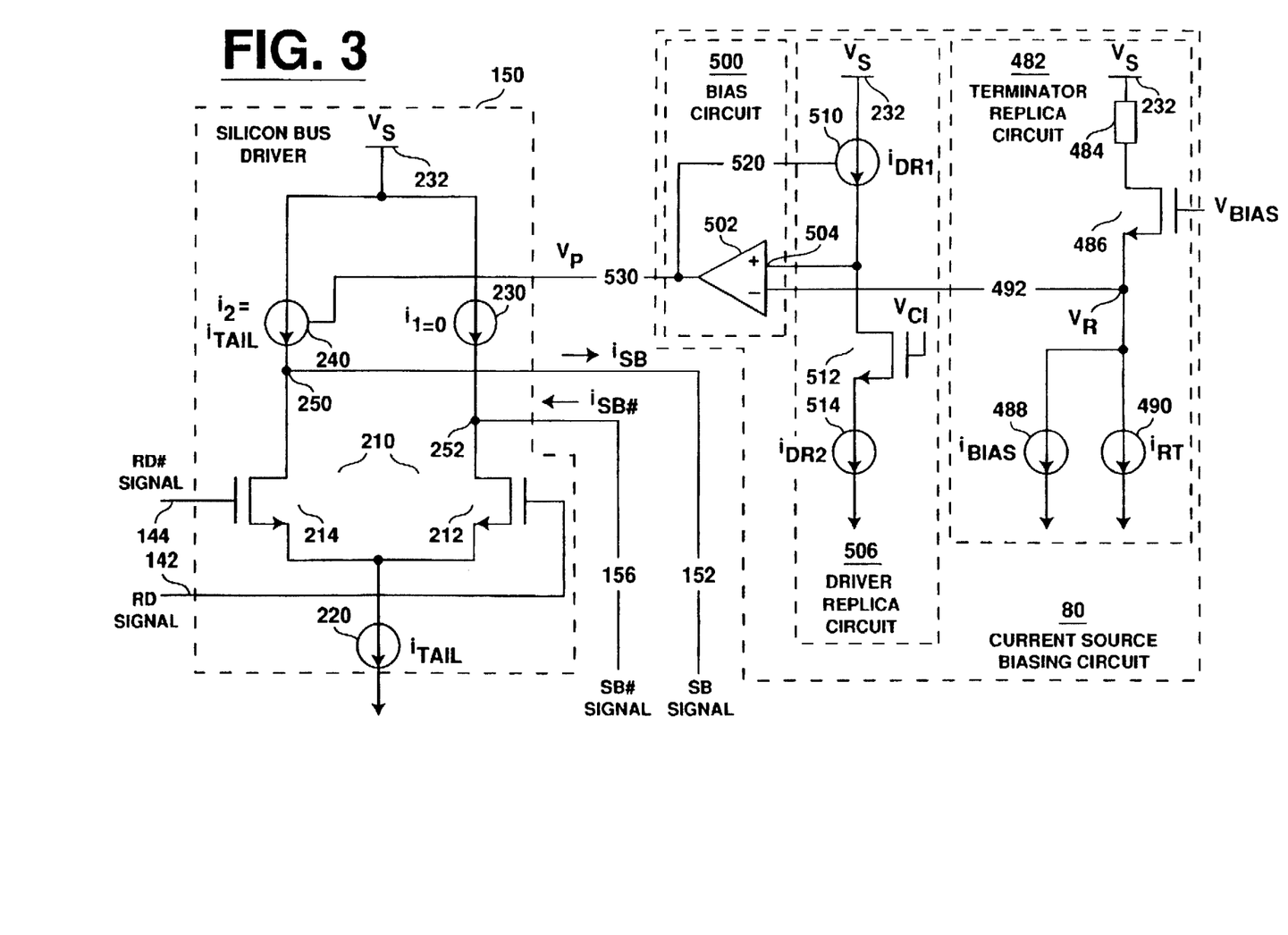
FIG. 3 is a circuit diagram of the silicon bus driver circuit and the current source biasing circuit.

Reference is now made to FIG. 3 which is a circuit diagram of the silicon bus driver 150 coupled to the current source biasing circuit 80. The complementary voltage signals on the first line 142 and the second line 144 are applied to a pair of transistors 210. The first transistor 212 and the second transistor 214 are preferably CMOS Transistors. However, other types of transistors can be used, as should be apparent to one skilled in the art. The first transistor 212 and the second transistor 214 are assumed to be operating in the saturation region. In the following discussion, all transistors to be discussed are assumed to be operating in the saturation region.

An RD (Receive Data) signal on the line 142 is supplied to a first transistor 212, and an RD# signal is supplied on the line 144 to a second transistor 214. As utilized herein, the pound character (#) is used to designate a complementary signal. For example, the "RD#" signal designates the complement of the "RD" signal.

The sources of the first transistor 212 and the second transistor 214 are coupled together and also are coupled to a tail current source 220 that draws a tail current of $i_{TAIL}$. The drain of the first transistor 212 is coupled to a first current source 230 that draws a first current $i_1$ from a constant voltage energy source 232 that maintains a constant voltage $V_s$. A second current source 240 that draws a second current $i_2$ is coupled to the drain of the second transistor 214. Preferably, the second current $i_2$ is equivalent to the tail current $i_{TAIL}$. Also preferably, the first current $i_1$ is zero; i.e., currents are prevented from flowing therethrough. The first current source 230 has the same transistor size as the second current source 240, and therefore provides a balanced load at the outputs on the first driver line 152 and the second driver line 156.

In one illustrative embodiment, both the tail current $i_{TAIL}$ and the second current $i_2$ equals 1.0 ma, and the first current $i_1$ equals 0.0 ma. The second current source 240 is a voltage controlled current source biased by a voltage $V_P$ supplied by the biasing circuit 80, as will be described elsewhere in more detail. Briefly, the purpose of the biasing circuit 80 is to guarantee that the output currents (the second current $i_2$ and the tail current $i_{TAIL}$) are equal at a zero differential voltage crossing at the input of the terminator circuit 50.

The outputs of the silicon bus driver 150 are coupled between the current sources 230, 240, and the drains of the transistors 210. Particularly, the first driving line 152 is coupled at an output node 250 between the second current source 240 and the second transistor 214, to provide an SB (silicon bus) signal. The second driving line 156 is coupled at an output node 252 between the first current source 230 and the first transistor 212 to provide an SB# signal.

Operation of the silicon bus driver 150 can be described with reference to the two states of the differential input signal: a "low" state and a "high" state. A low state is evidenced by a RD signal on the line 142 having a lower voltage than the RD# signal on the line 144. For a low differential signal, the first transistor 212 is turned off by a low RD signal, thus drawing no current therethrough. However, the second transistor 214 is turned on by the RD# signal, therefore drawing the full amount of the tail current $i_{TAIL}$, which is equal to the second current $i_2$ drawn by the second current source 240. As a result, no current will flow through the first driving line 152, and no current will flow through the second driving line 156.

The SB signal and the SB# signal are indicated by current flows rather than voltage differentials. As discussed above, a low differential input signal causes the SB signal ($i_{SB}$) to equal zero on the first driving line 152, and the SB# signal ($i_{SB#}$) to also equal zero on the second driving line 156. However, when the differential input signal goes high, the RD signal on the line 142 goes high and turns on the first transistor 212, and the RD# signal on the line 144 goes low and turns off the second transistor 214. In that instance, the second current $i_2$ drawn by the second current source 240 is output on the first driving line 152 to provide an $i_{SB}$ current equal to the second current $i_2$ which provides the current to indicate a "high" or dominant state in the SB signal. The tail current $i_{TAIL}$ which is drawn through the second transistor 212 causes a current $i_{SB#}$ equal to $i_{TAIL}$ to be drawn through the second driving line 156, to provide the SB# signal. In summary, in the low state (i.e., for a low differential input signal), the SB signal and the SB# signal have zero current. However, in the high state (i.e., for a high differential input signal), a current $i_{SB}$ is provided equal to the current $i_{SB#}$.

Reference is now made to FIG. 4 which is a circuit diagram of one embodiment of a terminator circuit 50. A pair of terminator transistors including a first conducting transistor 400 and a second transistor 410 are biased to the "on" state by a voltage of $V_{BIAS}$ (preferably $V_{BIAS}$=4.25 V where $V_S$=5.0 V). The first transistor 400 and the second transistor 410 are preferably CMOS transistors operating in the saturation region. However, other types of transistors can be used, as should be apparent to one skilled in the art.

The source of the first transistor 400 is coupled to a first terminator current source 420 that draws a first terminator current $i_{T1}$ which is preferably equal to the tail current $i_{TAIL}$. The source of the second transistor 410 is connected to a second terminator current source 422 that draws a second terminator current $i_{T2}$ which is preferably a zero current. A first resistor 430 couples the drain of the first transistor 400 with the voltage source 232, and a second resistor 432 couples the drain of the second transistor 410 with the voltage source 232. A current flowing through the first resistor 430 is designated by first resistor current $i_{R1}$, and a current flowing through the second resistor 432 is designated by a second resistor current $i_{R2}$. The first resistor 430 and the second resistor 432 are preferably designed as matching transistors, and the resistive value of the first resistor 430 equals that of the second resistor 432. All the current sources described herein are designed to track resistor variations. Resistor values may vary for reasons such as temperature changes, manufacturing differences, or for other reasons. All current sources are designed to be inversely proportional to resistor variations, in accordance with conventional techniques.

The outputs from the terminator circuit 50 include an SBR signal on the first output line 166 and SBR# signal on the second output line 168. The SBR signal on the line 166 is provided from a node 434 coupled between the first resistor 430 and the drain of the first transistor 400, and the SBR# signal on the line 168 is provided from a node 436 coupled between the second resistor 432 and the drain of the second transistor 410. The SBR signal on the line 166 is provided to the first transmitting bus line 162 (FIG. 2), and the SBR# signal on the line 168 is provided to the second transmitting bus line 164 (FIG. 2). As will be described, the SBR signal and the SBR# signal are evidenced by a differential voltage.

As mentioned previously, a bias voltage $V_{BIAS}$ is applied to the gates of the transistor 400 and the second transistor 410 to maintain them in the conducting state. Even with the bias voltage, many instances may occur in which no current would flow through the transistors 400 and 410. In those instances the transistors 400 and 410 would be slowed considerably unless a bias current were to be maintained. In order to increase the transistor speed (i.e., increase bandwidth), a first bias current source 440 is coupled to the source of the first transistor 400 to draw a bias current $i_{BIAS}$ therethrough, and a second bias current source 442 is coupled to the source of the second transistor 410 to draw a second bias current $i_{BIAS}$ therethrough. Preferably, the value of $i_{BIAS}$ is one-fourth of $i_{TAIL}$, which is 0.25 A in the preferred embodiment. Also preferably, an identical current value for the bias current, $i_{BIAS}$, flows through both the first bias current source 440 and the second bias current source 442, and therefore the differential voltage effect on the outputs (i.e., the SBR signal and the SBR# signal) is negligible.

In operation of the terminator circuit 50, an SB signal is supplied from the silicon bus driver circuit 150 (FIG. 3). As discussed previously, if the RD signal is low (non-dominant), then the SB signal and the SB# signal indicate this state by a zero current flow (i.e., $i_{SB}=0$ and $i_{SB\#}=0$). Therefore, the entire current $i_{TAIL}$ from the first terminator current source 420 flows through the first resistor 430, causing a voltage drop at the output SBR between the voltage source 232 and the drain of the first transistor 400. In the preferred embodiment, in which the tail current $i_{TAIL}$ is 1.0 ma and the value of the first resistor 430 is 500 ohms, the voltage drop across the resistor 430 is approximately one-half of a volt (ignoring the voltage drop of the bias current, which is approximately 0.125 volts). Since in the non-dominant state the current $i_{SB\#}$ equals zero, the SB# signal does not draw any current through the second transistor 410. As a result, the current flow $i_{R2}$ through the second resistor 432 is approximately zero (again ignoring the bias current). Therefore, the output SBR# signal on the line 168 is equal to approximately $V_S$, which in the preferred embodiment is approximately 5.0 volts (again ignoring the bias voltage drop). The resulting voltage difference between the SBR signal and the SBR# signal is "low" with the SBR signal having a differential voltage about one-half of a volt below the SBR# signal.

In the instance when the RD signal is high (i.e., the differential input signal is in the dominant state), then the SB signal through the line 159 provides the current $i_{SB}$ equal to $i_{TAIL}$ and the SB# signal through the line 160 provides the current $i_{SB\#}$ also equal to $i_{TAIL}$. In that instance, the SB signal provides the current $i_{T1}$ drawn by the first terminator current source 420. As a result, no current (except for the biased current) is drawn through the first resistor 430. Therefore the voltage value of the SBR signal on the line 166 is approximately equal to $V_S$, which is 5.0 volts in the preferred embodiment. The SB# signal draws a current $i_{SB\#}$ equal approximately to $i_{TAIL}$, and therefore $i_{R2}$, the current through the second resistor 432, is approximately equal to $i_{TAIL}$. This voltage drop lowers the voltage of the SBR# signal with respect to the SBR signal, thereby creating a "high" state.

Reference is again made to FIG. 3. The biasing circuit 80 includes a silicon bus terminator replica circuit 482, a driver replica circuit 506, and a bias circuit 500. The current source biasing circuit 80 controls the second current source 240, which is a voltage controlled current source, with a control voltage $V_P$. The voltage $V_P$ is determined in the biasing circuit 80 so that $V_P$ matches a control voltage at which the second current source 240 produces a second current $i_2$ equal to $i_{TAIL}$ when the differential voltage input signal is zero (i.e., when RD and RD# equal the common mode voltage). The common mode voltage occurs at a zero crossing of the differential input signal, at which point the first transistor 212 is equally conducting with the second first transistor 214, and therefore one-half of the tail current $i_{TAIL}$ is drawn through the second transistor 214 and the other one-half is drawn through the first transistor 212. Therefore, both currents—the current $i_{SB}$ on the line 152 and the current $i_{SB\#}$ on the line 156—equal one-half of the tail current. In the terminator circuit 50, this "one-half" current value ensures an equal current through both the first terminator transistor 400 and the second terminator transistor 410, which causes an equal current flow through both the first resistor 430 and the second resistor 432. The equal current flow causes a zero differential output across the output nodes 434 and 436. Thus, the biasing circuit 80 ensures that a zero crossing of the differential voltage input signal causes an approximately simultaneous zero crossing of the differential voltage output signal.

A purpose of the biasing circuit 80 is to compensate for the finite output impedances of the second current source 240 and the tail current source 220, and to force the currents $i_2$ and $i_{TAIL}$ to be equal at the zero crossing point (common mode voltage) of the first driver line 152 and the second driver line 156, i.e., where the voltages on the lines 152 and 156 are equal. By symmetry and matching, this ensures that the output voltages of the SBR and SBR# signals, at the output lines 166 and 168 of the terminator circuit 50 (FIG. 4), are equal at the zero crossing point, which means that, at the transmitting bus 42, the differential bus voltage will be zero.

Furthermore, the biasing circuit 80 reduces the requirements of the current sources substantially. Without the biasing circuit 80, design constraints would likely require a cascode design of the current sources, particularly those connected to the sources of the transistors of the terminator circuit 50 and the driver circuit 150. Elimination of the cascode circuit arrangement allows operation of these circuits at lower voltages, such as 5.0 volts to 3.0 volts.

The terminator replica circuit 482 includes a replica resistor 484 coupled to the voltage source 232 and a replica transistor 486 coupled at its drain to the replica resistor 484. A replica bias current source 488 and a replica current source 490 are both coupled to the source of the replica transistor 486. The terminator replica circuit 482 replicates the common mode voltage at the source of the replica transistor 486 at a zero voltage crossing (i.e., when the differential voltage between the SBR signal and the SBR# signal is zero.) The replica circuit 482 is similar to the terminator circuit 50: the gate of the replica transistor 486 is connected to $V_{BIAS}$, the replica transistor 486 is operating in the saturation region, the resistive value of the replica resistor 484 has the same value as the first and second resistors 430 and 432, the replica resistor 484 is coupled between $V_S$ and the replica transistor 486, and the current through the replica bias current source 488 is $i_{BIAS}$. The replica resistor 484 and the first and second resistors 430 and 432 are formed to be matching resistors. However, the replica current $i_{RT}$ through the terminator replica current source 490 is one-half of $i_{T1}$ (i.e., one-half of $i_{TAIL}$). The replica current $i_{RT}$ at one-half of $i_{TAIL}$, matches the current flow through the terminator transistors 400 and 410 when the receiving bus 40 is at a zero voltage that occurs at a zero crossing. At the zero crossing:

$$i_{SB} = i_{SB\#} = \frac{1}{2} i_{TAIL}.$$

Therefore, the terminator replica current $i_{RT}$ is equal to one-half of the tail current $i_{TAIL}$.

The output of the silicon bus terminator replica circuit 482 on a line 492 is a replica voltage $V_R$ supplied to a current bias circuit 500 situated within the biasing circuit 80. The replica voltage $V_R$ is the voltage at the source of the first and second transistors 400 and 410 at a zero crossing of the differential voltage output signal on the lines 166 and 168. The voltage $V_R$ on the line 492 is supplied to a first input of an operational amplifier (op amp) 502. A second input 504 of the op amp 502 is coupled to a driver replica circuit 506.

The driver replica circuit 506 includes a first driver replica current source 510 coupled between the voltage source 232 and a driver replica transistor 512 which has a size equal to twice the size of the transistors 214 and 212, which allows it to carry twice the current. The first driver replica current source 510 produces a current $i_{DR1}$. The first driver replica current source 510 is a voltage controlled current source that is controlled so that the current $i_{DR1}$ is approximately equal to the tail current $i_{TAIL}$ at a fixed voltage equal to the voltage of the node 250 at a zero crossing. The second input 504 to the op amp 502 is coupled between the first driver replica current source 510 and the drain of the driver replica transistor 512. The gate of the driver replica transistor 512 receives a common mode voltage input $V_{CI}$ equal to the common mode voltage of the inputs to the driver 150, which is the common mode voltage of the RD signal and the RD# signal on the lines 142 and 144. The common mode voltage $V_{CI}$ is supplied by any conventional means for determining this value. The source of the driver replica transistor 512 is coupled to a second driver replica current source 514 that produces a current $i_{DR2}$ that is approximately equal to the tail current $i_{TAIL}$.

The output of the op amp 502 from the bias circuit 500 is fed back on a line 520 to control the first driver replica current source 510 which is a voltage-controlled current source. The output of the operational amplifier 502 provides a control voltage value $V_P$ on a line 530 to the second current source 240. Thus, the control voltage $V_P$ forces the current $i_2$ flowing through the second current source 240 to equal $i_{TAIL}$ at the zero crossing point of two sets of signals: the RD and RD# signals, and the SBR and SBR# signals.

Reference is now made to FIGS. 1 through 4 to describe implementation of a dominant logic using the split bus configuration 35. For purposes of the following discussion, it will be assumed that the ports 30A, 30B, 30C, and 30D all utilize the same circuit disclosed in the port 30, shown in FIG. 2. Furthermore, in each driver 150 in the ports 30A–D, the second current source 240 and the tail current source 220 have identical current values. In other words, in each of the ports 30A–D that are coupled to the receiving bus 40, the second current sources 240 and the tail current sources 220 are designed so that an equivalent tail current $i_{TAIL}$ flows therethrough. It should be noted that the voltage $V_P$ on the line 530 is supplied to each of the ports 30A–D.

In operation, if all of the ports 30A–D are receiving a low differential input signal, then each of the ports 30A–D are supplying and drawing no current. Therefore, the terminator circuit 50 (FIG. 4) will output a low differential voltage signal on the transmitting bus 42, which will be supplied to the receivers in each of the ports 30A–D. However, if any one of the ports 30A–D were to receive a high differential input signal, then that port would begin supplying current on its first driving line 152, and drawing current on its second driving line 156. Therefore, the terminator circuit 50 would react as described previously, to output a high differential output signal to the transmitting bus 42.

If more than one port 30A–D were to receive a high input differential signal, then current is supplied to the terminator circuit 50 by all ports receiving that signal. The total amount of current will be a function of the number of ports supplying current. As a result of the additional current, the SBR signal on the line 166 (FIG. 4) will climb to the rail, i.e., it will approach $V_S$. Furthermore, the SB signal on the first driving line 159 will climb to the rail ($V_S$), and therefore the current sources 240 of the driving ports will not supply the full current that they would if the proper voltage difference were to be maintained. The SBR signal on the line 166 will remain approximately $V_S$ (5 volts). However, the SB# signal on the line 160 can still draw an SB# current $i_{SB\#}$ of two or more $i_{TAIL}$ currents. Therefore, the voltage drop across the second resistor 432 will be greater than would occur if only one $i_{TAIL}$ current were to be drawn. As a result, the SBR# signal on the line 168 may drop even lower. However, the high state (i.e., the dominant state) is indicated by a voltage difference, and therefore the existence of the voltage difference remains high even though the SBR# signal on the line 168 drops further in voltage. In other words, the output signal on the lines 166 and 168, which is provided to the transmitting bus 42 will still have a high (dominant) voltage difference. Therefore, a dominant state bus is provided which in the preferred embodiment has a dominant "high" logic.

The current source biasing circuit 80 provides a substantial advantage when multiple drivers 150 are coupled to the receiving bus 40. Without the biasing circuit 80, a substantial voltage offset may occur when multiple drivers 150 are driving the receiving bus 40 with current. This voltage offset could affect operation of the entire circuit, and render it nonoperational in some circumstances. An effect of the biasing circuit 80 is to reduce or eliminate this voltage offset, as well as to eliminate the requirement that the current sources of the driver circuit 150 and the terminator circuit 50 be cascoded.

Figure 5:
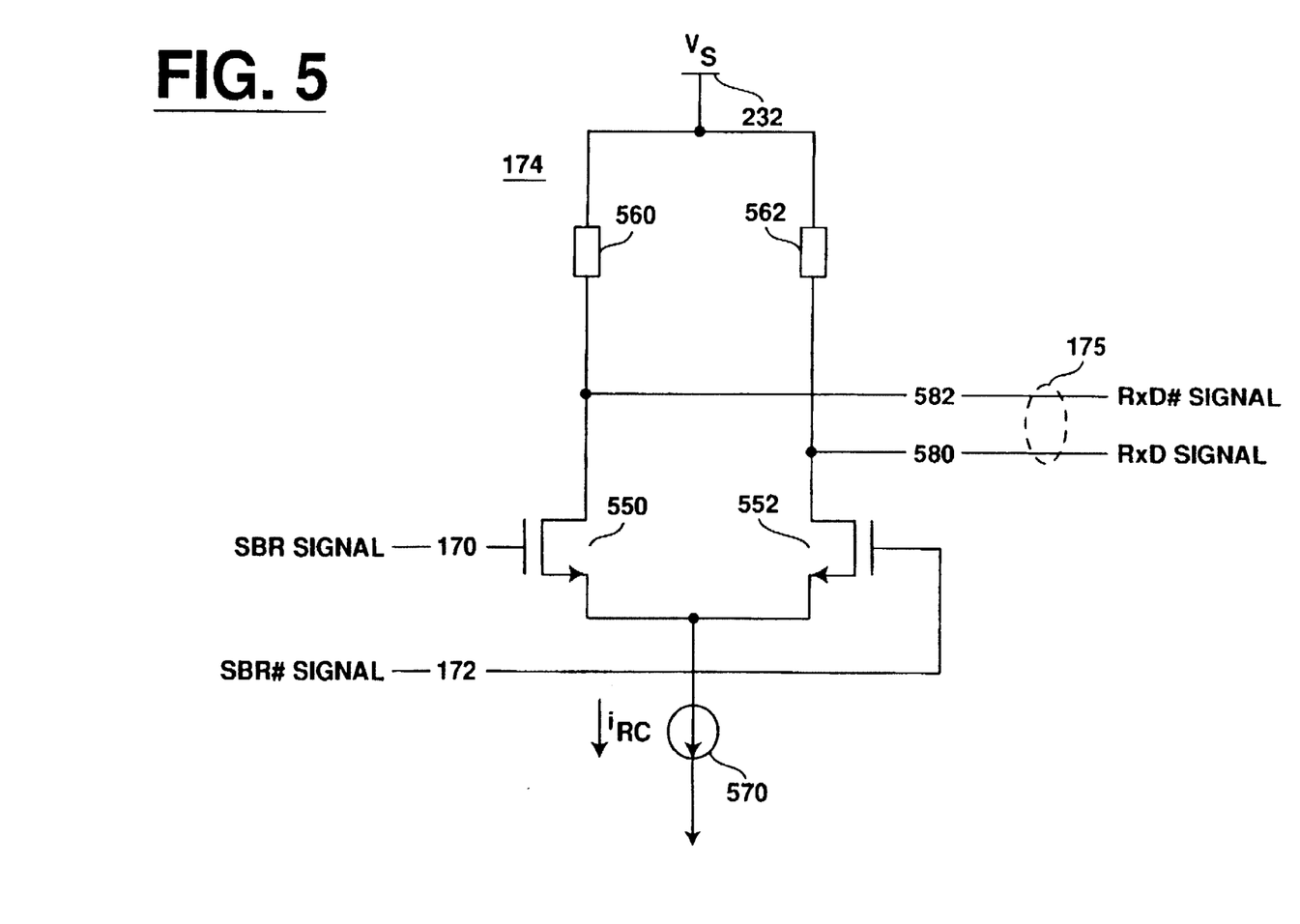
FIG. 5 is a circuit diagram of the differential receiver circuit.

Reference is made to FIG. 5 which illustrates a conventional differential receiver 174 having a difference amplifier configuration including a first transistor 550 and a second transistor 552. A first resistor 560 is coupled between the voltage source 232 and the drain of the first transistor 550, and a second transistor 562 is coupled between the voltage source 232 and the drain of the second transistor 552. The drains of both the first transistor 550 and the second transistor 552 are coupled at their drains to a receiver current source 570 that draws a current $i_{RC}$.

The inputs to the differential receiver circuit 174 include the SBR signal and the SBR# signal from FIG. 4, which together provide the differential voltage signal from the terminator circuit 50. These signals are provided through the transmitting bus 42 (FIG. 2). Specifically, the SBR signal is provided from the first transmitting bus line 162 through the first receiver line 170 to the gate of the first transistor 550 in the differential receiver circuit 174. The SBR# signal is supplied from the terminator circuit 50 through the second transmitting bus line 164, and through the second receiver line 172 to the gate of the second transistor 552. A pair 175 of receiver outputs are provided from the drains of the transistors in the receiver 174. Specifically, a RXD signal is supplied on a first line 580 coupled between the second transistor 552 and the second resistor 562, and an RXD# signal is supplied on a line 582 coupled between the first transistor 550 and the first resistor 560.

From the above description, it will be apparent that the invention disclosed herein provides a novel and advantageous differential signal bus circuit for a dominant logic bus. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. A logic bus that communicates differential signals between a plurality of ports, each port of said plurality of ports including a bus driver coupled to receive a differential input signal and, responsive thereto to output a first differential bus signal, said logic bus comprising:

a first differential bus coupled to said bus drivers in said plurality of ports to receive said first differential bus signals from said bus drivers;

a terminator circuit coupled to said first differential bus to receive said first differential bus signal, and responsive thereto, to output a second differential bus signal; and a second differential bus coupled to said terminator circuit to receive said second differential bus signal, said second differential bus coupled to a receiver in each of said plurality of ports;

wherein said logic bus is a high speed dominant logic bus, and said differential input signal indicates one of a dominant state and a nondominant state, the state indicated by said input signal being determined by an arbitration process performed by nodes coupled to said logic bus.

2. The logic bus of claim 1 further comprising:

an internal port including an internal silicon bus driver coupled to the first differential bus, said internal port further including a logic circuit for providing bidirectional data flow on said logic bus during said arbitration process and unidirectional data flow on said logic bus during data transfer cycles on said logic bus;

an internal receiver coupled to the second differential bus; and a local host coupled to the internal port.

3. A bus circuit for a logic bus that communicates differential signals between a plurality of ports including a first port and a second port, the first port receiving a differential voltage input signal, said logic bus being a high speed dominant logic bus, said logic bus circuit comprising:

a bus driver coupled to receive the differential voltage input signal received by the first port and responsive thereto to output a differential bus current signal, said differential voltage input signal indicating one of a dominant state and a nondominant state, the state indicated by said differential voltage input signal being determined by an arbitration process performed by nodes coupled to said logic bus;

a receiving bus coupled to the bus driver to receive the differential bus current signal;

a terminator circuit coupled to the receiving bus to receive the differential bus current signal, and responsive thereto to output a differential bus voltage signal;

a transmitting bus coupled to the second differential bus to receive the differential bus voltage signal; and a logic circuit coupled to said bus driver for providing bi-directional data flow on said logic bus during said arbitration process and unidirectional data flow on said logic bus during data transfer cycles on said logic bus.

4. A node for a high speed communication system, said system having a dominant logic state, said dominant logic state of said system being determined by an arbitration process performed by said node and other nodes in said system, said node comprising:

a dominant logic bus, said bus including a first differential bus and a second differential bus;

a plurality of ports for receiving and transmitting differential signals;

an internal port including an internal silicon bus driver, each said differential bus being coupled to said plurality of ports and said internal port;

a logic circuit coupled to said bus driver for providing bidirectional data flow on said logic bus during said arbitration process and unidirectional data flow on said logic bus during data transfer cycles on said logic bus; and a terminator circuit coupled to at least one of said first differential bus and said second differential bus.

* * * * *